US008083950B2

(12) United States Patent
Shon et al.

(10) Patent No.: US 8,083,950 B2
(45) Date of Patent: Dec. 27, 2011

(54) METHODS FOR RECOVERING ORGANIC-INORGANIC ELEMENT-DOPED METAL OXIDES FROM HYDROLYSABLE METAL COMPOUNDS ASSOCIATED WITH CONTAMINATED WATER TREATMENT

(75) Inventors: Hokyong Shon, New South Wales (AU); Vigneswaran Saravanamuthu, New South Wales (AU); Erdei Laszlo, New South Wales (AU); Jong Ho Kim, Gwangju-si (KR); Jong Beom Kim, Gwangju-si (KR); Dong Lyun Cho, Gwangju-si (KR); Byung Chul Choi, Gwangju-si (KR); Kun Jung Kim, Seoul (KR); Myung Wan Kim, Gwangju-si (KR); Sung Jung Song, Gwangju-si (KR); Hee Ju Park, Gwangju-si (KR); Jaeweon Cho, Gwangju-si (KR); In-soo Kim, Gwangju-si (KR); Seung-hyun Kim, Kyungnam (KR)

(73) Assignees: Photo & Environmental Technology Co., Ltd., Gwangju-su (KR); University of Technology, Sydney, Sydney, New South Wales (AU)

(*) Notice: Subject to any disclaimer, the term of this patent is extended or adjusted under 35 U.S.C. 154(b) by 557 days.

(21) Appl. No.: 12/161,293

(22) PCT Filed: Jan. 18, 2006

(86) PCT No.: PCT/KR2006/000201
§ 371 (c)(1),
(2), (4) Date: Mar. 19, 2009

(87) PCT Pub. No.: WO2007/078024
PCT Pub. Date: Jul. 12, 2007

(65) Prior Publication Data
US 2009/0218294 A1 Sep. 3, 2009

(30) Foreign Application Priority Data

Dec. 30, 2005 (KR) .................. 10-2005-0134947

(51) Int. Cl.
*C02F 1/52* (2006.01)
(52) U.S. Cl. ... 210/710; 210/721; 210/737; 210/748.07; 210/748.14; 423/85; 423/610; 423/612
(58) Field of Classification Search ............ 210/710
See application file for complete search history.

(56) References Cited

U.S. PATENT DOCUMENTS 3,627,679 A * 12/1971 Fuller ........................ 210/711
5,332,508 A * 7/1994 Foster et al. ................ 210/711
5,674,402 A 10/1997 Nilsson et al.
(Continued)

FOREIGN PATENT DOCUMENTS
JP 10-76275 3/1998
(Continued)

*Primary Examiner* — Peter A Hruskoci
(74) *Attorney, Agent, or Firm* — Hoffmann & Baron LLP

(57) ABSTRACT

The present invention relates to a method for recovering an organic-inorganic element-doped metal oxide from a hydrolysable metal compound, accompanied with contaminated water treatment. The present invention comprises steps of: a) adding a hydrolysable metal compound as a coagulant to a contaminated water to form a separable floc between the hydrolysable metal compound and contaminants present in contaminated water; b) separating the separable floc and the pre-treated water after flocculation treatment; and c) calcinating the separated floc over 500° C. to produce an organic-inorganic element-doped metal oxide. More preferably, the present invention further comprises subjecting the pre-treated water of the step b) to a microwave treatment to cause a photocatalytic degradation of an organic contaminant that remains in the pre-treated water, with the assistance of the remaining hydrolysable metal compound. A novel titanium compound is found as an alternative coagulant instead of iron and aluminum salts which most widely use in water treatment. Ability, capacity and efficiency of flocculation as the proposed titanium coagulant are similar to those of $FeCl_3$ and alum coagulants in terms of removing organic matter. Titania produced by calcination of the separated floc after $TiCl_4$ flocculation is mainly doped with C and P atoms.

7 Claims, 16 Drawing Sheets

U.S. PATENT DOCUMENTS

| | | | |
|---|---|---|---|
| 5,720,882 A | | 2/1998 | Stendahl et al. |
| 6,123,854 A | * | 9/2000 | Iwane et al. .................. 210/716 |
| 6,251,264 B1 | * | 6/2001 | Tanaka et al. ................ 210/96.1 |
| 6,482,327 B1 | * | 11/2002 | Mori et al. .................... 210/695 |

FOREIGN PATENT DOCUMENTS

| | | | |
|---|---|---|---|
| JP | 2000-237759 | | 9/2000 |
| JP | 2000237759 | * | 9/2000 |
| KR | 2003-0084413 | | 11/2003 |

* cited by examiner

METHODS FOR RECOVERING ORGANIC-INORGANIC ELEMENT-DOPED METAL OXIDES FROM HYDROLYSABLE METAL COMPOUNDS ASSOCIATED WITH CONTAMINATED WATER TREATMENT

FIELD OF INVENTION

The present invention is directed to a method for recovering an organic-inorganic element-doped metal oxide from a hydrolysable metal compound, accompanied with contaminated water treatment. After flocculation with the hydrolysable titanium compound as a novel coagulant, the separated floc is calcinated to produce a titania doped with organic and inorganic elements and the pre-treated water is subjected to a microwave treatment to cause a photocatalytic degradation of the organic contaminant that remains in the pre-treated water.

BACKGROUND OF INVENTION

The systematic water treatment was started in the late 1800s and early 1900s (Tchobanoglous and Burton, 1991). For the last two centuries, water treatment has continually been developed to meet strict disposal standards. Water treatment processes consist of physical, chemical, and biological means. Chemical treatments indicate that the removal or conversion of contaminants is brought about by the addition of chemicals or by other chemical reactions. Flocculation, precipitation, ion exchange, adsorption, and disinfection are the most common chemical treatment methods.

Flocculation consists of four distinct mechanisms: i) compression of the diffuse layer (van der Waals interaction), ii) adsorption to produce charge neutralization (destabilization), iii) enmeshment in a precipitate (sweep coagulation) and iv) adsorption to permit interparticle bridging (complex between particle and polymer with synthetic organic coagulant). Rapid mixing leads to the charge neutralization of colloids/particles through uniform and immediate disposal of chemicals with water. Flocculation which follows the rapid mixing results in the aggregation of particles. Flocculation can occur through three major mechanisms: i) Brownian movement of fluid molecules (perikinetic flocculation), ii) velocity gradient in the fluid (orthokinetic flocculation) and iii) differential settling of different sizes of particles in the water (Vigneswaran and Visvanathan, 1995). Coagulants are classified into three groups mainly used in the real application: i) aluminium sulfate (72%), ii) iron salts (23%), and iii) polyaluminum chlorides (5%) (DeWolfe et al., 2003). Alum and ferric chloride are the most common coagulants. The use of ferric chloride and polyaluminum chloride for water treatment has been increasing over the last few decades.

Metal oxides are often used in advanced oxidation processes which are defined as production of hydroxyl radicals in sufficient quantities to oxidize majority of the complex chemicals present (Gogate and Pandit, 2003). Hydroxyl radicals have an oxidation potential of 2.8 V and exhibits faster rates of oxidation reactions as compared to that using conventional oxidants like hydrogen peroxide or $KMnO_4$. Hydroxyl radicals react with most organic and many inorganic solutes (Hoigne, 1997). Titania ($TiO_2$) is the most widely used metal oxide. Degradation of waste compound proceeds via oxidative (electrophilic) attack of HO. and leads to complete mineralization to yield innocuous $CO_2$ and mineral acids. This process is based on the electronic excitation of a molecule or solid caused by light absorption e.g. UV light that drastically alters its ability to lose or gain electrons and promote decomposition of pollutants to harmless by-products (Molinari et al., 2002). Photoinduced electrons ($e^-$) and positive holes ($h^+$) are produced from $TiO_2$ with UV light. These charged species can further generate free radicals. The highly oxidizing positive hole ($h^+$) is considered to be the dominant oxidizing species contributing to the mineralization process resulting from the $TiO_2$ photocatalysis (Chu and Wong, 2004). The principal advantages of the $TiO_2$/UV process are suitable in water treatment without the addition of large amounts of chemicals, no follow-up treatments (filtration, etc.) are necessary and applicability over a wide range of pH values. Photocatalysis can also be applied in small scale applications such as houses (water sterilizer, air sterilizer), automobiles (frost-preventing glass, anti-germ seat) and sterilizing devices. It can also be used to get rid of germs and malodors from polluted air. The photocatalytic technology can keep air and water clean, using ultraviolet (UV) or sunlight. Therefore, the demand of titania is increasing more and more.

There is a need for a development of a new coagulant to induce metal oxides in water treatment. This will lead to an efficient and economical water treatment. Also, this will meet the demand of metal oxides used in many applications.

SUMMARY OF THE INVENTION

The first part includes the effect of hydrolysable metal compounds as a coagulant in terms of remaining organic matter, molecular weight distribution and protein-like substances in the contaminated water. $FeCl_3$ and alum are the most-widely used coagulants in water treatment so that the embodiment compares a novel $TiCl_4$ coagulant with those coagulants.

The second part comprises characteristics of titania generated from the calcined floc after $TiCl_4$ flocculation. A doping source of titania is investigated by energy dispersive X-ray (EDX). Mass balance of titania obtained from the contaminated water used in this invention is calculated to identify an impurity ratio. Optical property of titania produced after 600° C. calcination is examined with UV-VIS-NIR spectrophotometer.

The third part consists of preparation of metal oxides from different flocs produced by $FeCl_3$, alum and $TiCl_4$ flocculation. Different structures at different temperatures are presented.

The fourth part comprises effect of a photocatalytic reaction with the remaining hydrolyzed titanium compound in the pre-treated water after flocculation followed by microwave treatment. An overall rate constant is investigated.

DETAILED DESCRIPTION OF THE INVENTION

The present invention comprises two major parts: i) production of metal oxides using the separated flocs after flocculation treatment in a contaminated water and ii) microwave treatment to the pre-treated water to cause a photocatalytic reaction with the assistance of the remaining hydrolyzed metal compound. As used herein, the term "contaminated water" refers to any water which requires water treatment, including surface water, groundwater and wastewater.

Figure 1:
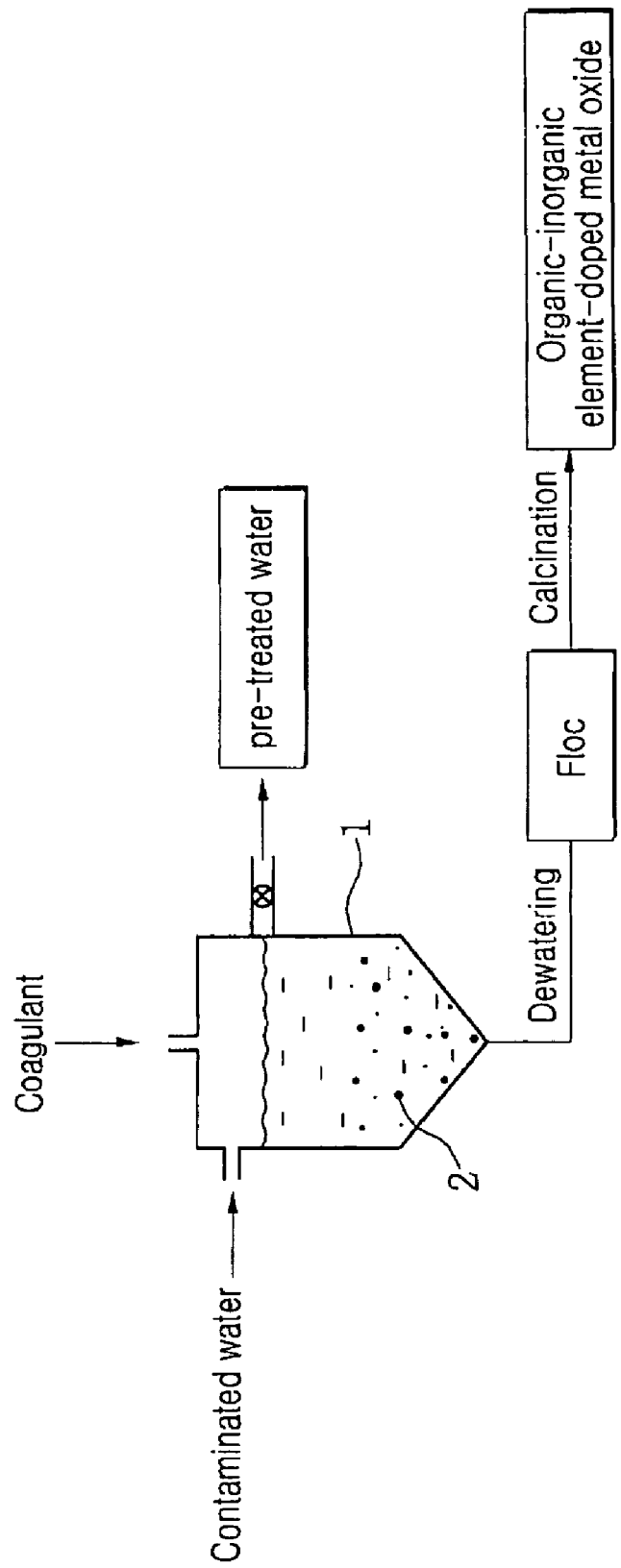
FIG. 1 is a schematic diagram showing a preferred embodiment of the method for recovering organic-inorganic element-doped metal oxide with the separated floc after flocculation treatment from contaminated water, in accordance with the present invention.

FIG. 1 is a schematic diagram showing a preferred embodiment of the method for recovering organic-inorganic element-doped metal oxides from the separated flocs after flocculation treatment of contaminated water. The contaminated water is supplied to the flocculation basin (1), and thereto, a hydrolysable metal compound is added as a coagulant. The optimum concentration of the metal compound depends on the characteristics of the contaminated water.

Flocculation mechanisms to aggregate particles into the separable floc are complex. When the hydrolysable metal compound is added, rapid mixing leads to the charge neutralization so that the aggregation of particles occurs. Slow mixing leads to the growth of heavy flocs (2) which easily settle down due to the gravity force. Here, the hydrolysable metal compound of the present invention includes a hydrolysable titanium compound, a hydrolysable aluminium compound, a hydrolysable iron compound, a zinc compound, a copper compound and a zirconium compound. The hydrolysable metal compound is generally provided as a chloride or sulfate salt. For example, the titanium compound may be any one selected from the group consisting of titanium trichloride, titanium tetrachloride, titanyl sulfate, titanium sulfate, titanium oxysulfate, titanium iron sulfate and titanium oxychloride. In addition, titanium alkoxides may be used. As a hydrolysable iron compound, iron chloride and iron sulfate can be mentioned. As a hydrolysable aluminium compound, aluminum chloride and aluminum sulfate can be mentioned. Of these metal compounds, the hydrolysable titanium compound is more preferred due to a wide range of synergistic effects, which will be more fully illustrated in the following.

The separable floc (2) is separated from the pre-treated water. The separated floc (2) is further subjected to a calcination process to produce an organic-inorganic element-doped metal oxide According to the preferred embodiment of the present invention, calcination of the separated floc formed by the hydrolysable titanium compound in the contaminated water produced white organic-inorganic element-doped titania at a temperature in the range of 500-1000° C. For temperature of less than 500° C., the black titania is obtained due to remaining organic matter. More than 1000° C., the energy consumption is high. Thus, the 500-650° C. of temperature range is most advantageous with respect to energy requirement and photocatalytic activity. Titania produced such ways will be referred to hereinafter as "photocatalyst from contaminated water (PFW)" products. The PFW has both an amorphous and anatase. The primary size is 10 nm as a crystalline anatase.

Figure 2:
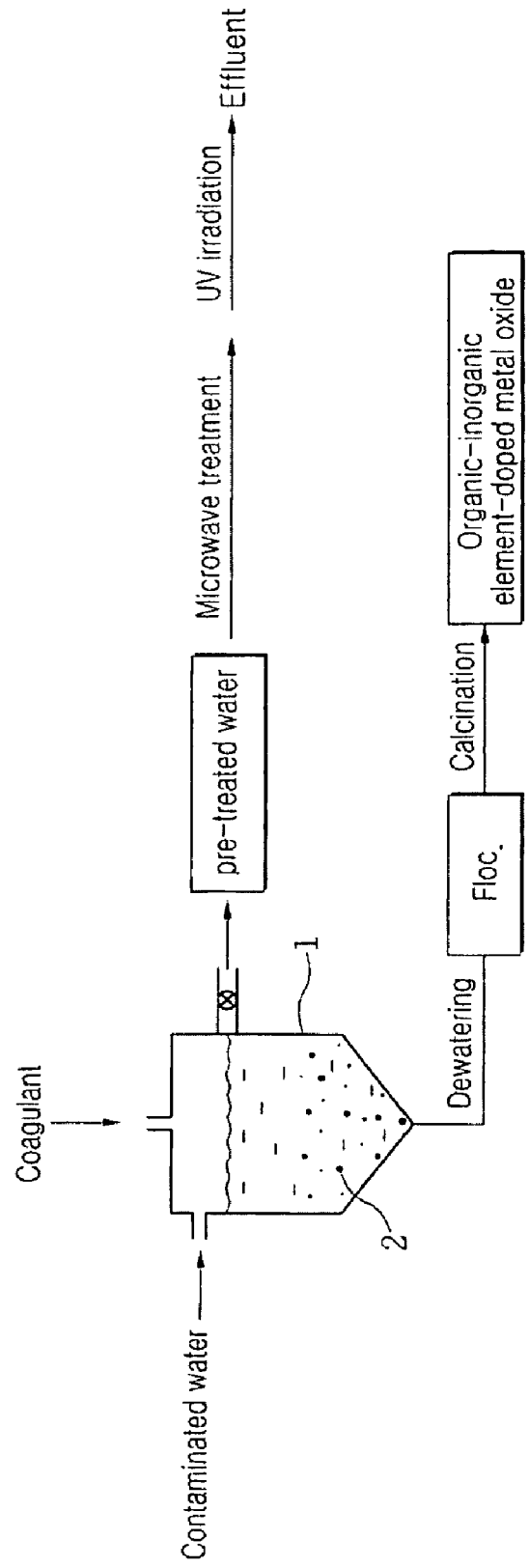
FIG. 2 is a schematic diagram showing more preferred embodiment of the method for recovering organic-inorganic element-doped metal oxide with the separated floc after flocculation treatment from contaminated water, in accordance with the present invention, wherein the pre-treated water is subjected to a microwave treatment to involve a photocatalytic reaction with the assistance of the remaining hydrolysable metal compound in the pre-treated water.

FIG. 2 is a schematic diagram showing more preferred embodiment of the method for recovering organic-inorganic element-doped metal oxide with the separated flocs after flocculation treatment from contaminated water, wherein the pre-treated water is further subjected to a microwave treatment to involve a photocatalytic reaction with the assistance of the residual hydrolysable metal compounds in the pre-treated water. After TiCl$_4$ flocculation treatment, the separated floc (2) is separated and the pre-treated water is discharged from the tank. Due to imperfect separation and/or dissolution, the pre-treated water still has some residual hydrolysable titanium compound. Then, the pre-treated water is heated with microwave to endow an improved photocatalytic property to the remaining hydrolysable titanium compound and the pre-treated water is irradiated with ultraviolet (UV) light. This leads to a photocatalytic reaction, which additionally degrades the remaining organic matter present in the pre-treated water. This process results in high synergistic effect in terms of the use of the remaining titanium compound and the higher removal of organic matter in water treatment.

The present invention will be illustrated in terms of the following non-limiting examples.

EXAMPLE 1

Removal of Organic Matter by Hydrolysable Metal Compounds as a Coagulant

The experiments using synthetic wastewater were conducted. The composition of the synthetic wastewater used in this study is presented in Table 1. This synthetic wastewater represents effluent organic matter generally found in the biologically treated sewage effluent (Seo et al., 1997). The synthetic wastewater will be referred to hereinafter as a contaminated water. Tannic acid, sodium lignin sulfonate, sodium lauryle sulfate, peptone and arabic acid contributed to the large molecular weight (MW) size organic matter, while the natural organic matter from tap water, peptone, beef extract and humic acid consisted of the small MW organic matters. The MW of the mixed synthetic wastewater ranged from 290 to about 34100 daltons with the highest fraction at 940-1200 daltons. The weight-averaged MW of the wastewater was approximately 29500 daltons. The concentration of the contaminated water was 10.05 mg/L and the pH was 7.3. Flocculation was carried out by standard jar tests. The contaminated water was placed in a two-liter container. The sample was stirred rapidly for 1 minute at 100 rpm, followed by 20 minutes of slow mixing at 30 rpm and 30 minutes of settling.

Figure 3:
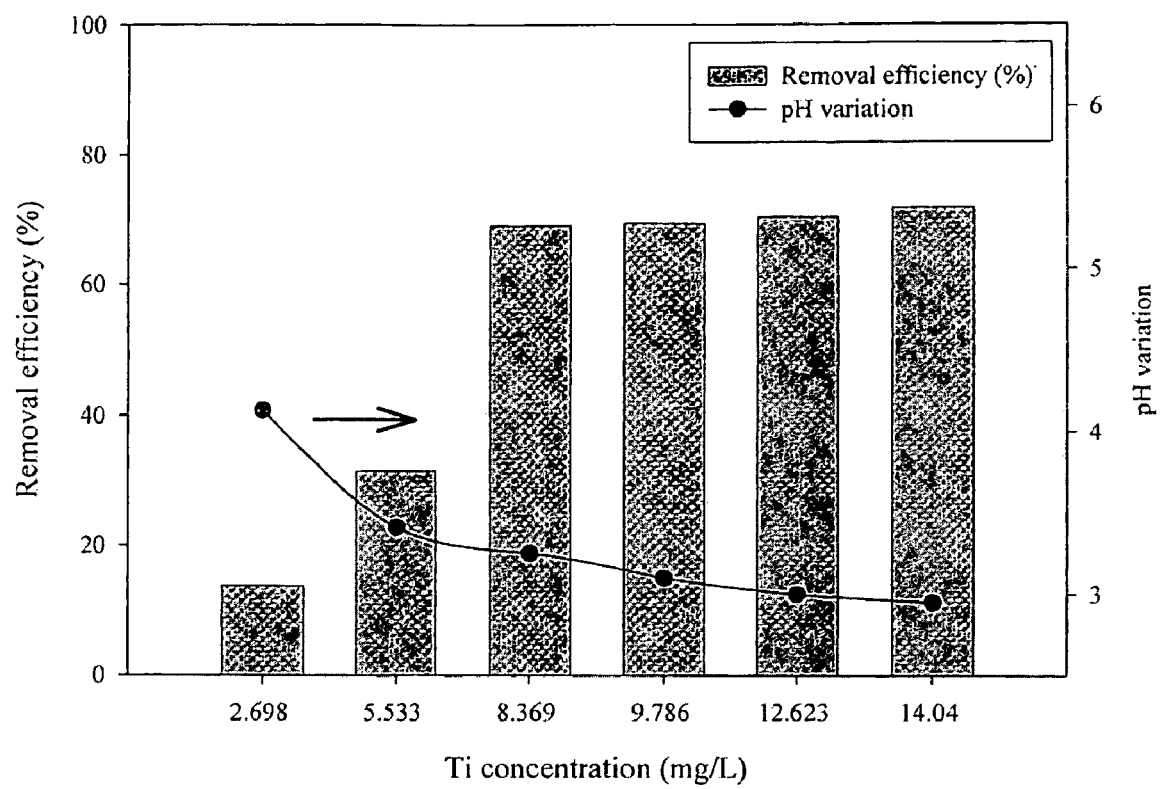
FIG. 3 is a graph showing organic removal and pH variation after $TiCl_4$ flocculation as a novel coagulant (initial concentration of organic matter=10.05 mg/L; initial pH=7.3).
Figure 4:
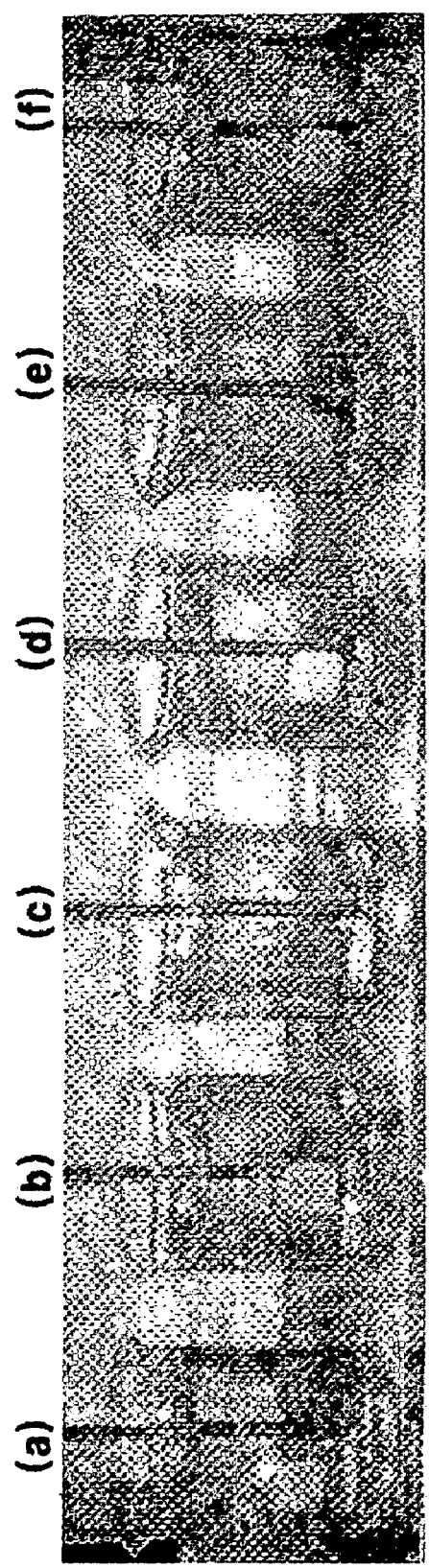
FIG. 4 is a photo during TiCl$_4$ flocculation, wherein TiCl$_4$ was added in an amount of: (a) 2.70 Ti-mg/L; (b) 5.53 Ti-mg/L; (c) 8.37 Ti-mg/L; (d) 9.79 Ti-mg/L; (e) 12.62 Ti-mg/L; and (f) 14.04 Ti-mg/L, respectively.
Figure 5:
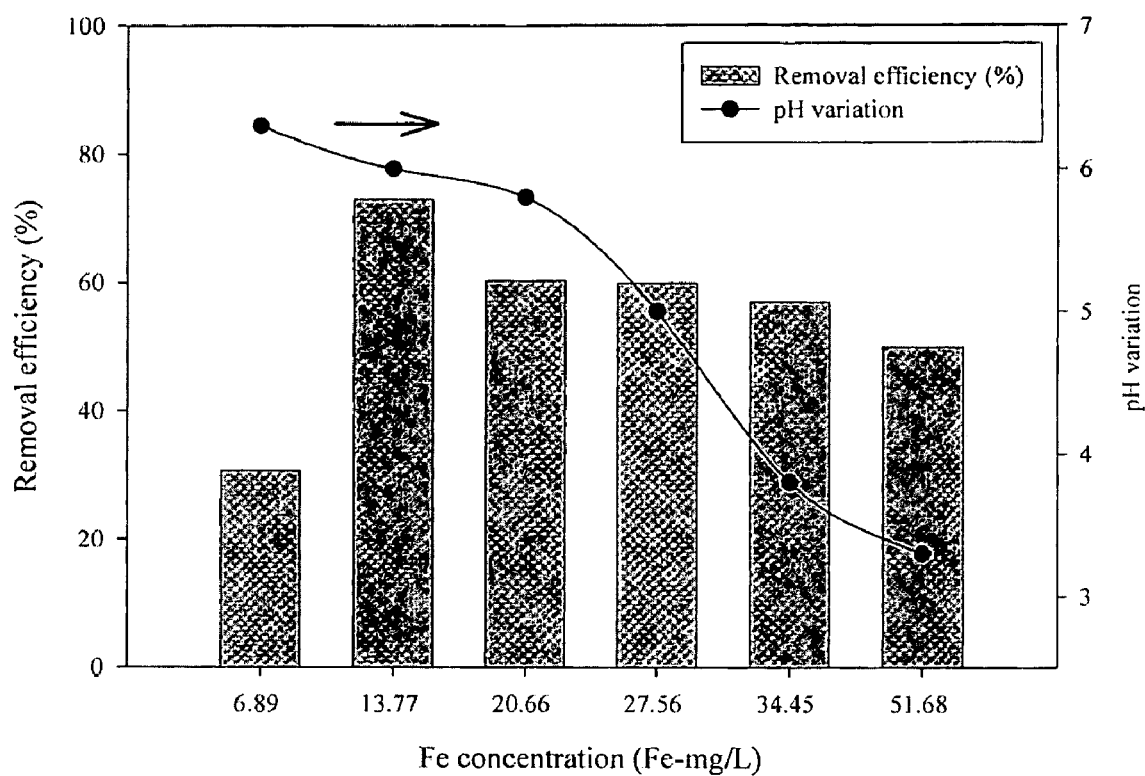
FIG. 5 is a graph showing organic removal and pH variation after FeCl$_3$ flocculation (initial concentration of organic matter=10.05 mg/L; initial pH=7.3).
Figure 6:
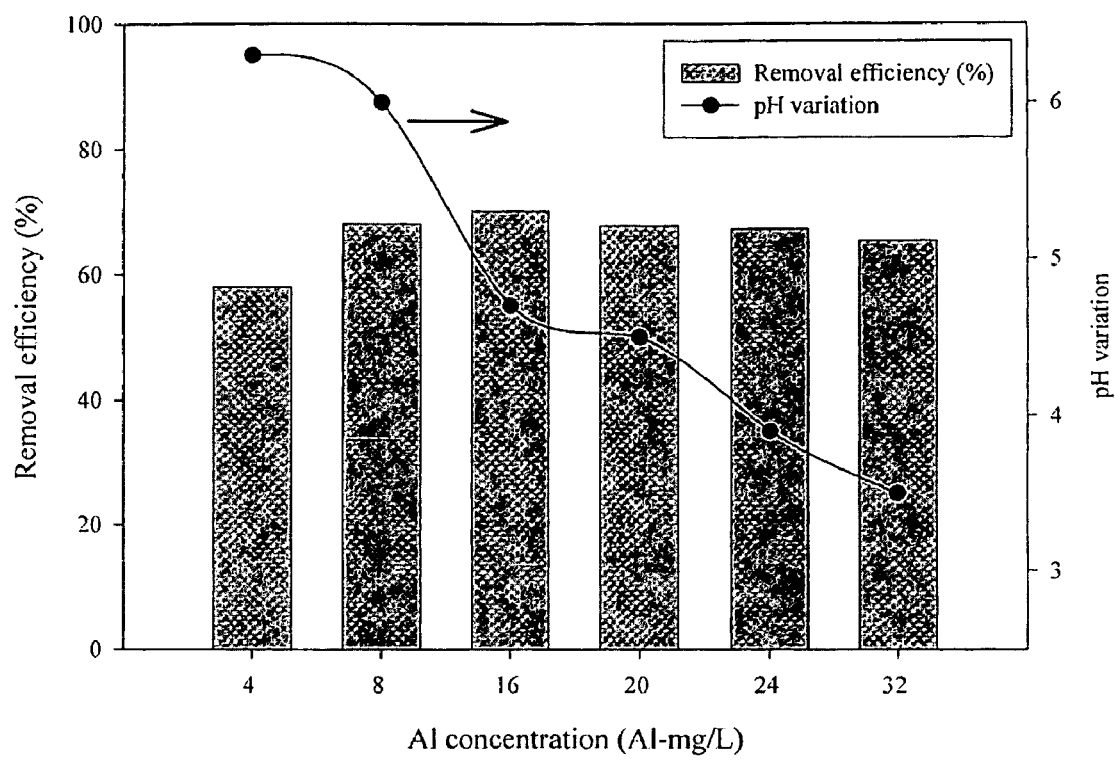
FIG. 6 is a graph showing organic removal and pH variation after alum flocculation (initial concentration of organic matter=10.05 mg/L; initial pH=7.3).

The hydrolysable metal compounds ($TiCl_4$, $FeCl_3$ and alum) were used. First, it is essential to investigate the optimal doses of different coagulants, the variation of pH and organic removal. FIG. 3 shows the removal of organic matter with $TiCl_4$ flocculation. The concentrations of the coagulant were varied from 2.70 to 14.04 Ti-mg/L. As shown in FIG. 3, the organic removal was about 70% at 9.786 Ti-mg/L. A photo of $TiCl_4$ flocculation is shown in FIG. 4. As shown in FIG. 5 and FIG. 6, the optimum concentrations of $FeCl_3$ and alum were 13.77 Fe-mg/L and 8 Al-mg/L, respectively. Compared with $FeCl_3$ and alum flocculation, the organic removal by $TiCl_4$ flocculation was approximately equivalent by up to 70%. This suggests that the $TiCl_4$ compound proposed in the present invention is a novel effective alternative coagulant.

TABLE 1

Constituents and characteristics of the contaminated water

| Compounds | Concentration (mg/L) | Main molecular weight (dalton) | Fraction by organic matter |
|---|---|---|---|
| Beef extract | 1.8 | 298, 145, 65 | 0.065 |
| Peptone | 2.7 | 34265, 128, 80 | 0.138 |
| Humic acid | 4.2 | 1543, 298 | 0.082 |
| Tannic acid | 4.2 | 6343 | 0.237 |
| Sodium lignin sulfonate | 2.4 | 12120 | 0.067 |
| Sodium lauryle sulphate | 0.94 | 34265 | 0.042 |
| Arabic gum powder | 4.7 | 925, 256 | 0.213 |
| Arabic acid (polysaccharide) | 5.0 | 38935 | 0.156 |
| $(NH_4)_2SO_4$ | 7.1 | — | — |
| $K_2HPO_4$ | 7.0 | — | — |
| $NH_4HCO_3$ | 19.8 | — | — |
| $MgSO_4 \cdot 7H_2O$ | 0.71 | — | — |

EXAMPLE 2

Molecular Weight (MW) Distribution and Protein-Like Substance of Organic Matter after $TiCL_4$ Flocculation High pressure size exclusion chromatography (HPSEC, Shimadzu Corp., Japan) with a SEC column (Protein-pak 125, Waters Milford, USA) was used to determine the MW distributions of organic matter. The separation ranges are between about 1000 and 30000 daltons. The effluent was made of pure water with phosphate (pH 6.8) and NaCl (0.1 M). The detection limit of UV was 0.001 per cm. Standards of MW of various polystyrene sulfonates (PSS: 210, 1800, 4600, 8000, and 18000 daltons) were used to calibrate the equipment. A fluorescence detector was also used to identify protein-like substances at excitation (279 nm) and emission (353 nm). Standards of polystyrene sulfonates with different MW (PSS: 210, 1800, 4600, 8000, and 18000 daltons) at lower concentration were used to calibrate the equipment. Details on the measurement methodology are given elsewhere (Her, 2002).

Figure 7:
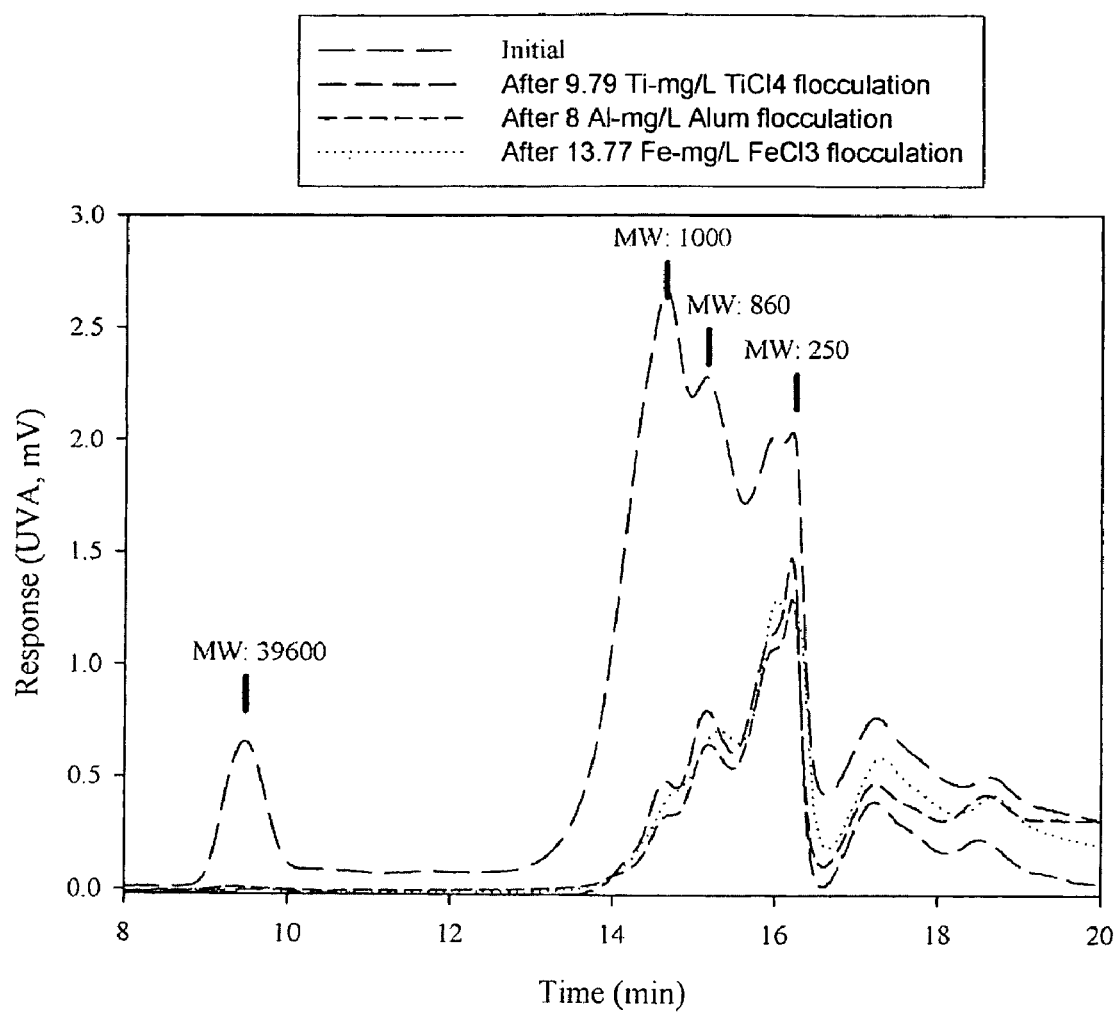
FIG. 7 is a graph showing removal of organic molecular weight distribution after different coagulants.
Figure 8:
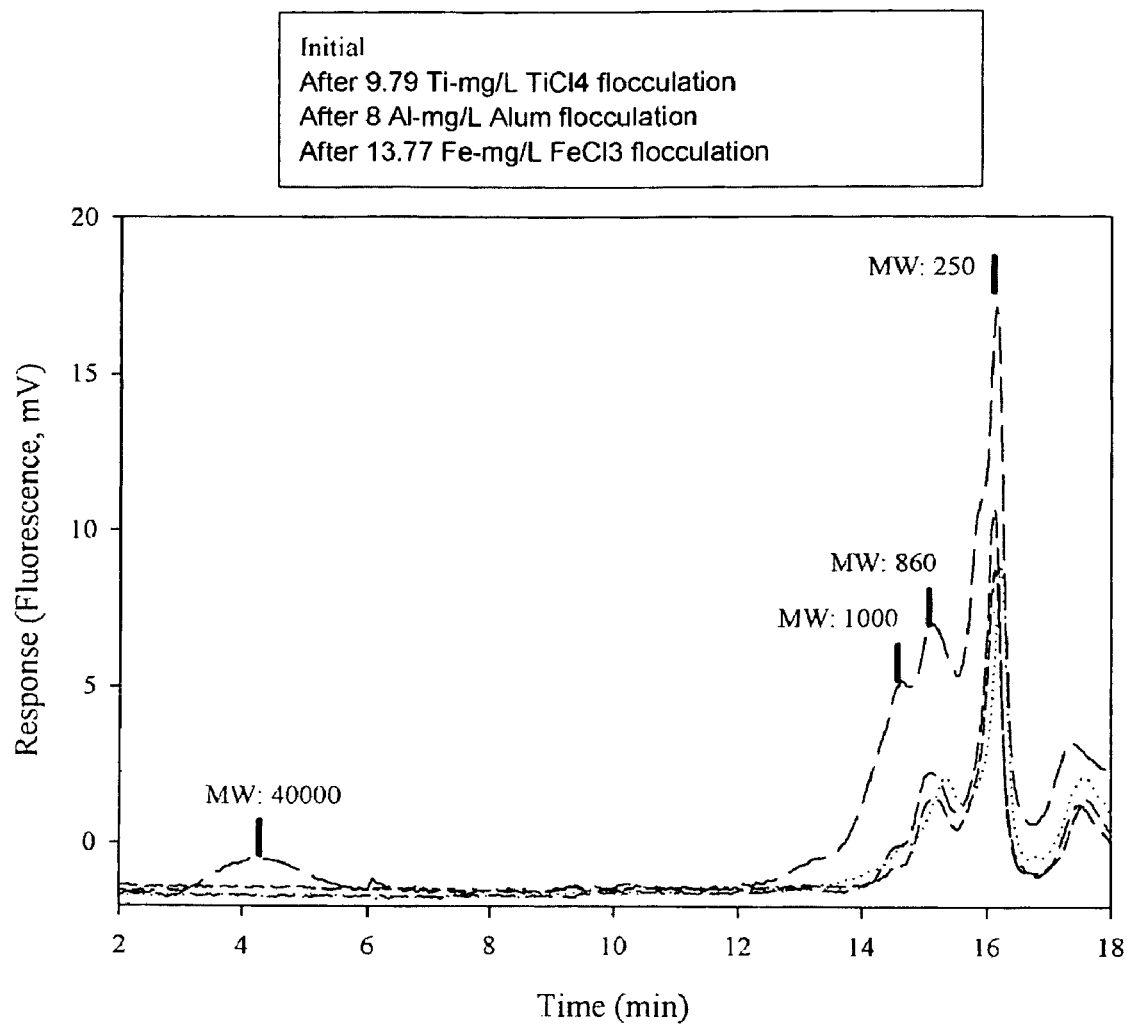
FIG. 8 is a graph showing removal of protein-like substances after different coagulants.

FIG. 7 and FIG. 8 describe MW distribution and florescence chromatogram of organic matter after $TiCl_4$, $FeCl_3$ and alum flocculation at the optimum doses, respectively. All three coagulants showed a similar trend of organic removal. They removed practically all of the large MW organic matter such as tannic acid, sodium lignin sulfonate, sodium lauryle sulfate and arabic acid. Further, the flocculation was also helpful in removing some of the small MW compounds (860-1000 daltons) such as peptone, beef extract and humic acid. However, the smallest MW range of compounds in the range of 250 daltons was not be removed by flocculation. The removal of protein-like substances, as indicated by fluorescence chromatogram, also showed a similar removal trend.

EXAMPLE 3

Decantability Test of the Separated Flocs

Figure 9:
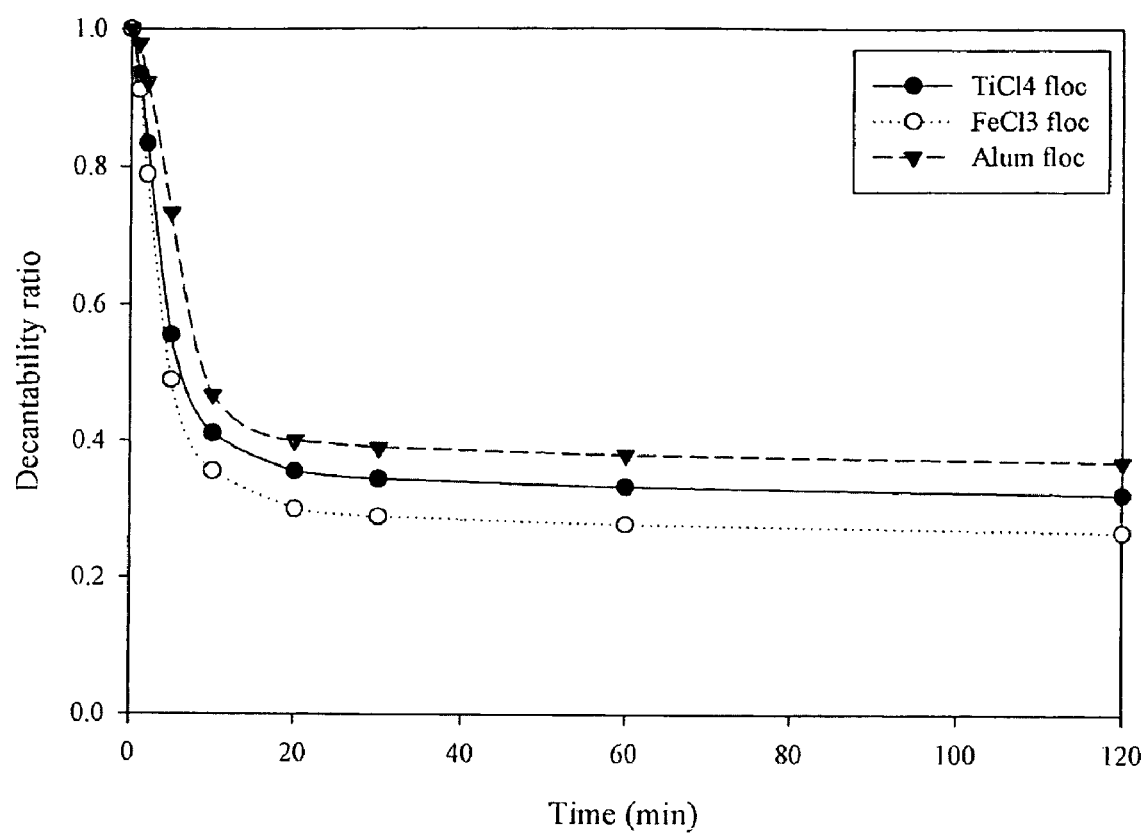
FIG. 9 is a graph depicting decantability ratio of the flocs produced by different coagulants.

The decantability test of the separated floc was conducted in measuring the head of the floc in terms of length (cm) (FIG. 9). Iron floc separated faster than $TiCl_4$ and alum. The decantability was found to be in order of $FeCl_3 > TiCl_4 >$ alum. The colors of $FeCl_3$, $TiCl_4$ and alum flocs were black, brown and gray, respectively. The mean size of the Ti, Fe and Al flocs was 47.54 μm, 42.50 μm and 16.91 μm, respectively. The decantability was proportional to the floc size formed.

EXAMPLE 4

Preparation of Organic-Inorganic Element-Doped Titania

Figure 10:
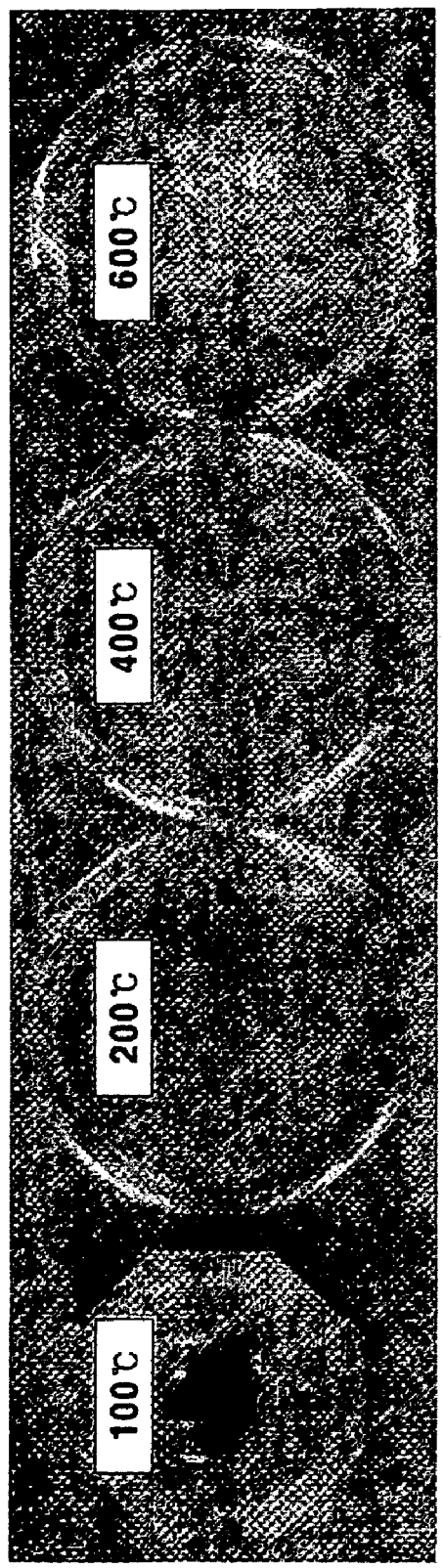
FIG. 10 is a photo of titania powder by calcination at different temperatures.

FIG. 10 shows photos of titania material produced by calcination at different temperatures. As the temperature increased, the color of powdered $TiO_2$ has changed from black to white. This may be due to the effect of remaining organic matter.

Figure 11:
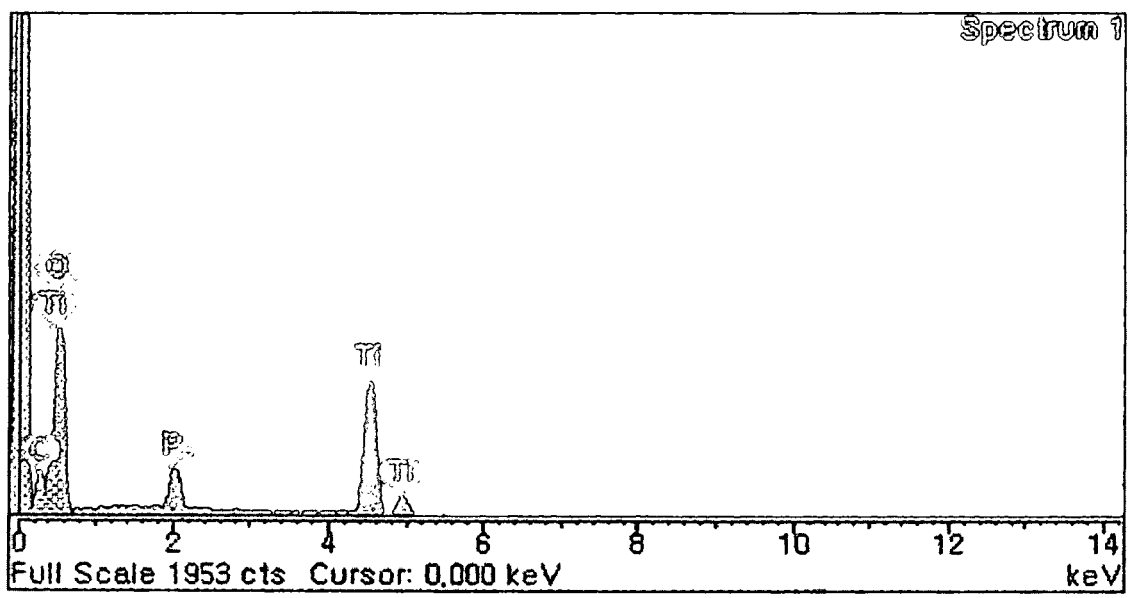
FIG. 11 is an EDX element graph of the titania obtained after calcination at 600° C.

The PFW titania was compared with P-25 $TiO_2$ powder (Degussa, Germany), which is commonly used commercially available product. The PFW titania was identified on the EDX graph as shown in FIG. 11. Table 2 presents the weight fraction of doped element in PFW titania. Carbon was present in all temperature ranges and mainly Ti, C, O and P atoms were detected. In addition, many trace elements (Si, Fe, Al, V, Ca, Na, Cr, Cl, S, Ni, and Br) were also found.

When 9.786 mg of Ti concentration (as the hydrolysable $TiCl_4$ compound) was dosed, 17.86 mg of the PFW titania was experimentally recovered. Equation 1 shows the mass balance:

$$(\text{Ti input})_{Theoretical} - 0.6085*(\text{TiO2-output})_{Theoretical} = (\text{Ti input})_{Experimental} - 0.6085*(\text{Particle production})_{Experimental} + \text{Impurity} \quad (1)$$

Thus, the impurity was 1.78 mg in the PFW titania particles made by this invention. The weight percentage of the impurity was 9.97%. Based on this mass balance, for a medium size (25000 m³/d) plant, about 446.5 kg/d of the PFW titania could be produced.

TABLE 2

Weight fraction (%) of PFW particle after calcinations with ±3.5% of standard deviation (P-25 TiO$_2$: Ti = 47.22% and O = 52.78%)

|    | 100° C. | 200° C. | 400° C. | 600° C. | 800° C. | 1000° C. |
|----|---------|---------|---------|---------|---------|----------|
| C  | 18.83%  | 16.69%  | 14.00%  | 11.99%  | 7.15%   | 5.88%    |
| O  | 51.64%  | 52.39%  | 50.21%  | 52.26%  | 54.03%  | 53.31%   |
| P  | 2.98%   | 2.24%   | 3.27%   | 3.78%   | 3.67%   | 1.80%    |
| Ti | 25.99%  | 28.68%  | 31.55%  | 31.97%  | 40.16%  | 40.00%   |

* Trace element found in PFW: Si (0.2%), Fe (0.02%), S (0.01%), Al (0.01), V, Ca, Na, Cr, Cl, Ni, and Br

EXAMPLE 5

Preparation of Organic-Inorganic Element-Doped Metal Oxides

Figure 12:
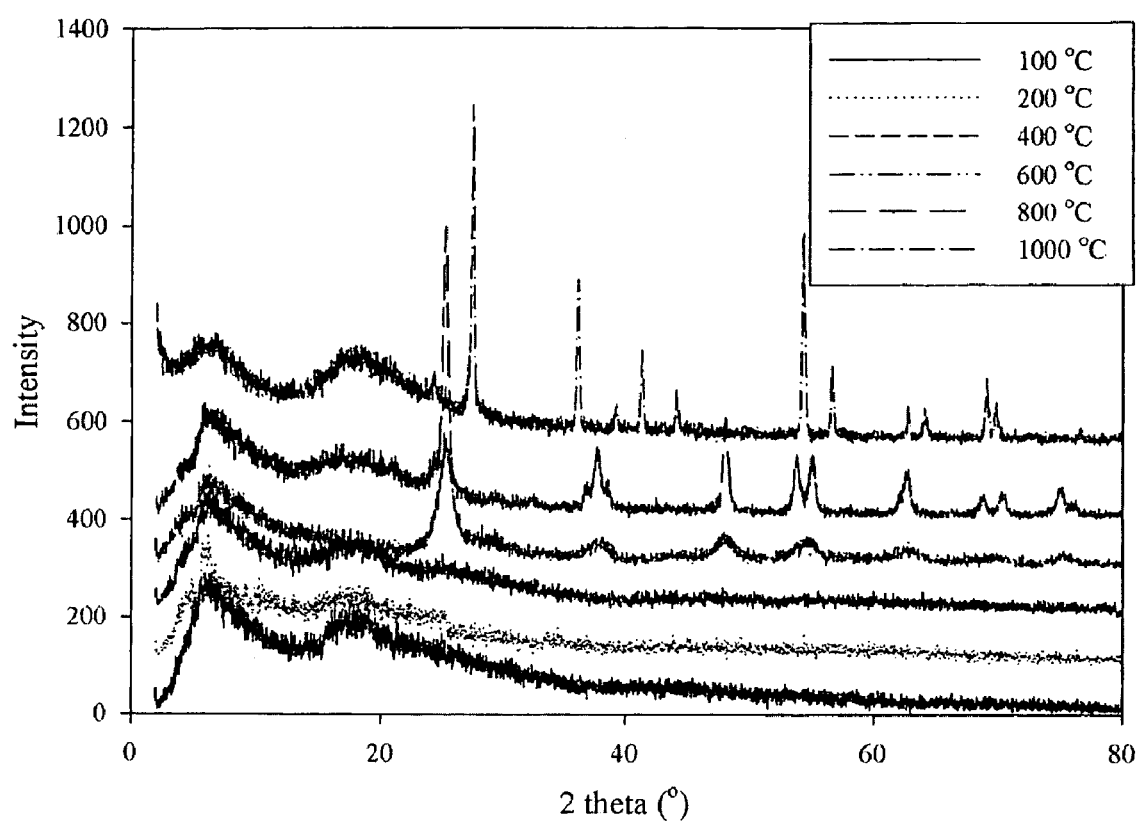
FIG. 12 is a graph depicting XRD images of the floc produced by TiCl$_4$ flocculation after calcination at different temperatures.

FIG. 12 shows X-ray diffraction (XRD) images (Rigaku, Japan) of the PFW titania to identify the particle structure. All the XRD patterns were analyzed with MDI Jade 5.0 (Materials Data Inc.). The anatase crystal indicated 25°, 38° and 48° of diffraction peak. On the other hand, the rutile crystal included 27°, 36° and 41° of diffraction peak. The anatase pattern was found from more than 600° C. At lower temperature, remaining organic matter interfered with crystalline titania production. At 1000° C., the anatase structure changed into rutile. Although there are a variety of compounds in the contaminated water, only genuine titania structures were investigated. Here, the narrower XRD pattern of annealed sample at 1000° C. was compared with that at 600° C. This may be due to the grain growth of titania (Tonejc et al., 2001). Based on the result of Liao et al., the transformation temperature of anatase to rutile at ambient pressure is about 550° C. However, in this study, the transformation temperature exceeded over 800° C. This may be due to impurities in the PFW titania.

Figure 13:
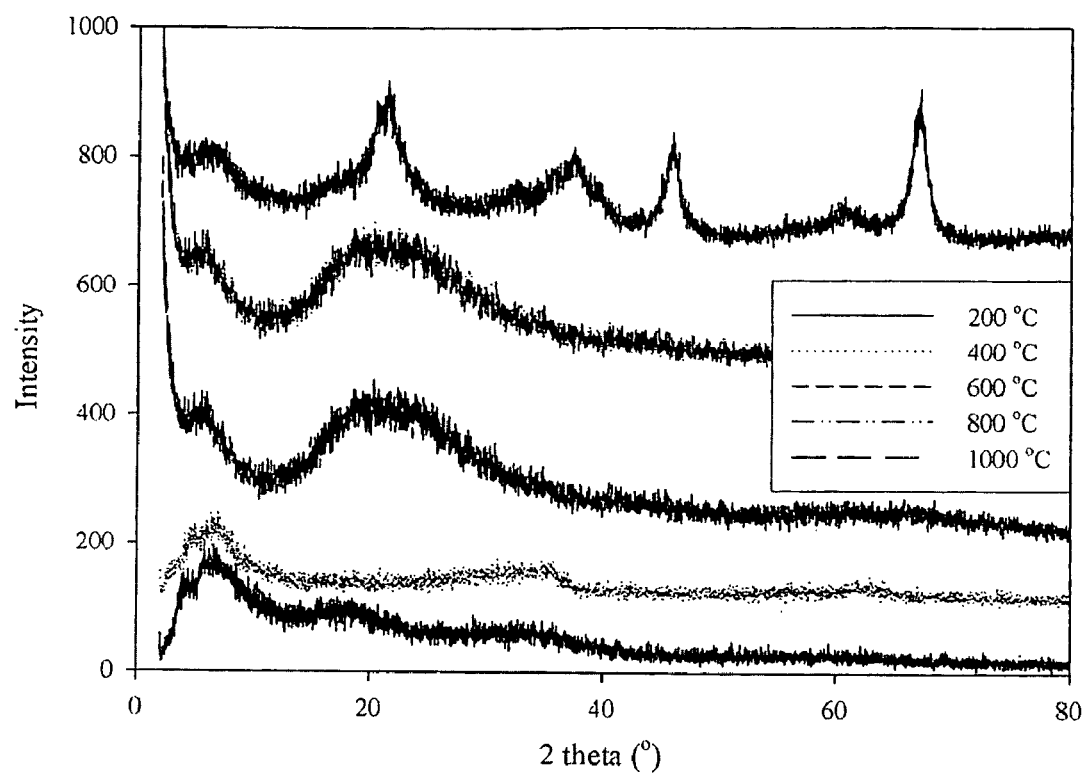
FIG. 13 is a graph depicting XRD images of the floc produced by alum flocculation after calcination at different temperatures (Al$_2$O$_3$: 32.3°, 34.6°, 36.9°, 39.0°,45.0°, 46.3°, 60.8°, 67.8°).
Figure 14:
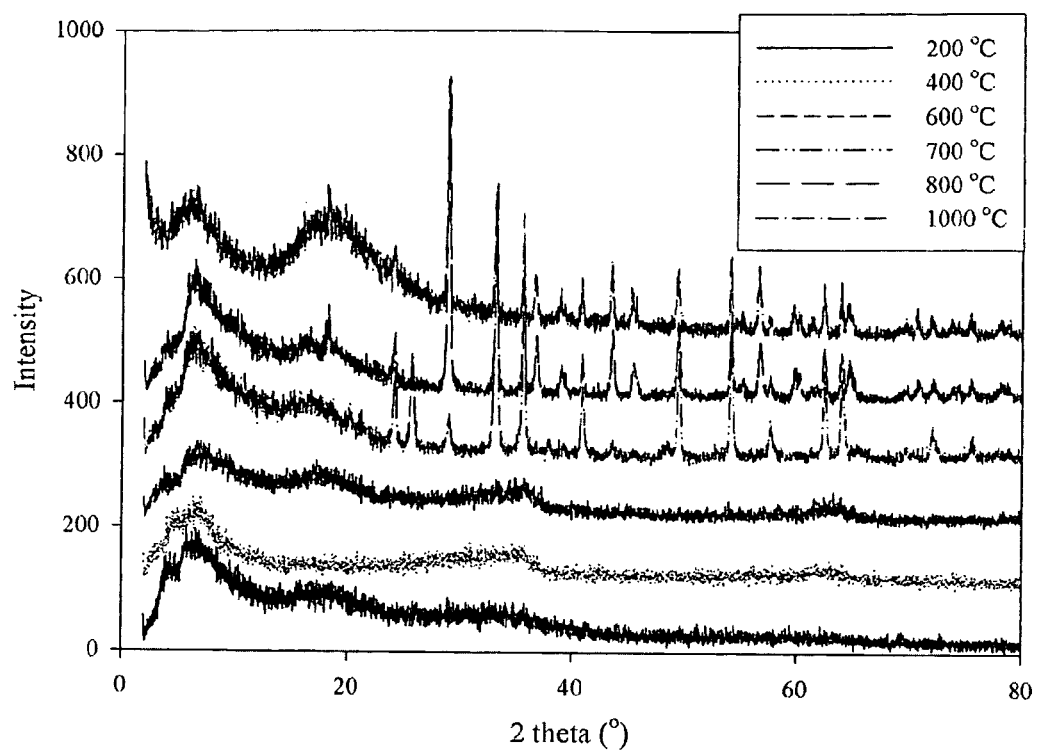
FIG. 14 is a graph depicting XRD images of the flocs produced by FeCl$_3$ flocculation after calcination at different temperatures (hematite (Fe$_2$O$_3$): 24°, 33°, 35°, 40.5°, 49.4°, 54°, 57.5°, 62.5°, 63.9°, 71.8°, 75.3°; grattarolaite (Fe$_3$(PO$_4$)O$_3$ or Fe$_3$PO$_7$): 18.2°, 28.9°, 36.8°, 38.9°, 43.3°, 45.3°, 45.6°, 49.2°, 55.1°, 56.7°, 59.7°, 60.1°, 61.5°, 64.7°, 70.4°).

The flocs with FeCl$_3$ and alum indicated different trends. In the case of alum, only Al$_2$O$_3$ was obtained at 1000° C. (FIG. 13). Interestingly, berlinite (AlPO$_4$) could not be made from alum flocs. On the other hand, the flocs after FeCl$_3$ flocculation were found to be different structures (hematite (Fe$_2$O$_3$) and grattarolaite (Fe$_3$(PO$_4$)O$_3$ or Fe$_3$PO$_7$) (FIG. 14). A zinc oxide, a copper oxide and zirconium oxide by a zinc compound, a copper compound and a zirconium were also made.

EXAMPLE 6

Optical Property of the PFW Titania after 600° C. Calcination

Figure 15:
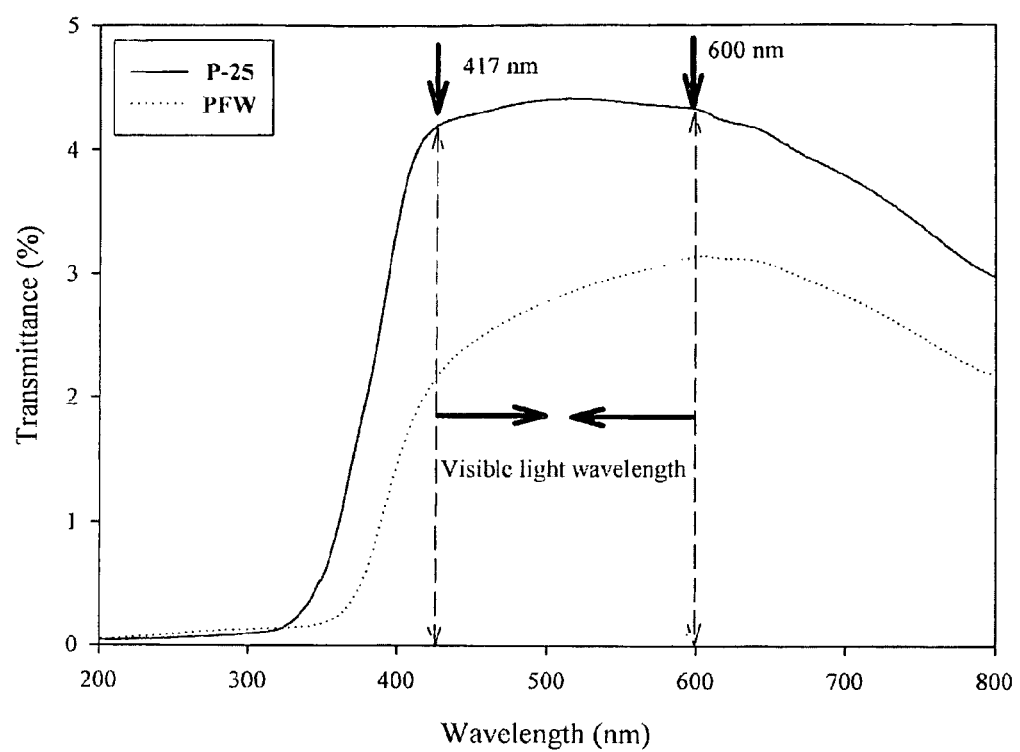
FIG. 15 is a graph showing optical transmittance of the two titanias. The real line is obtained from the conventional titania denoted as P-25, and the dotted line from the titania obtained from the present invention denoted as PFW.

FIG. 15 shows optical transmittance (%) of P-25 and PFW photocatalysts using UV-VIS-NIR spectrophotometer (Cary 500 Scan, Varian, USA). The P-25 photocatalyst absorbed the majority of UV light (less than 417 nm wavelength). The PFW photocatalyst however absorbed not only UV light but also visible light (from 600 nm to 400 nm). This suggests that the PFW photocatalyst can be used with the sources of solar irradiation and interior lighting (such as fluorescent light). The result is similar to that of Asahi et al., (2001). Asahi et al., (2001) reported that TiO$_{2-x}$N$_x$ noticeably absorbs the light at less than 600 nm.

EXAMPLE 7

Figure 16:
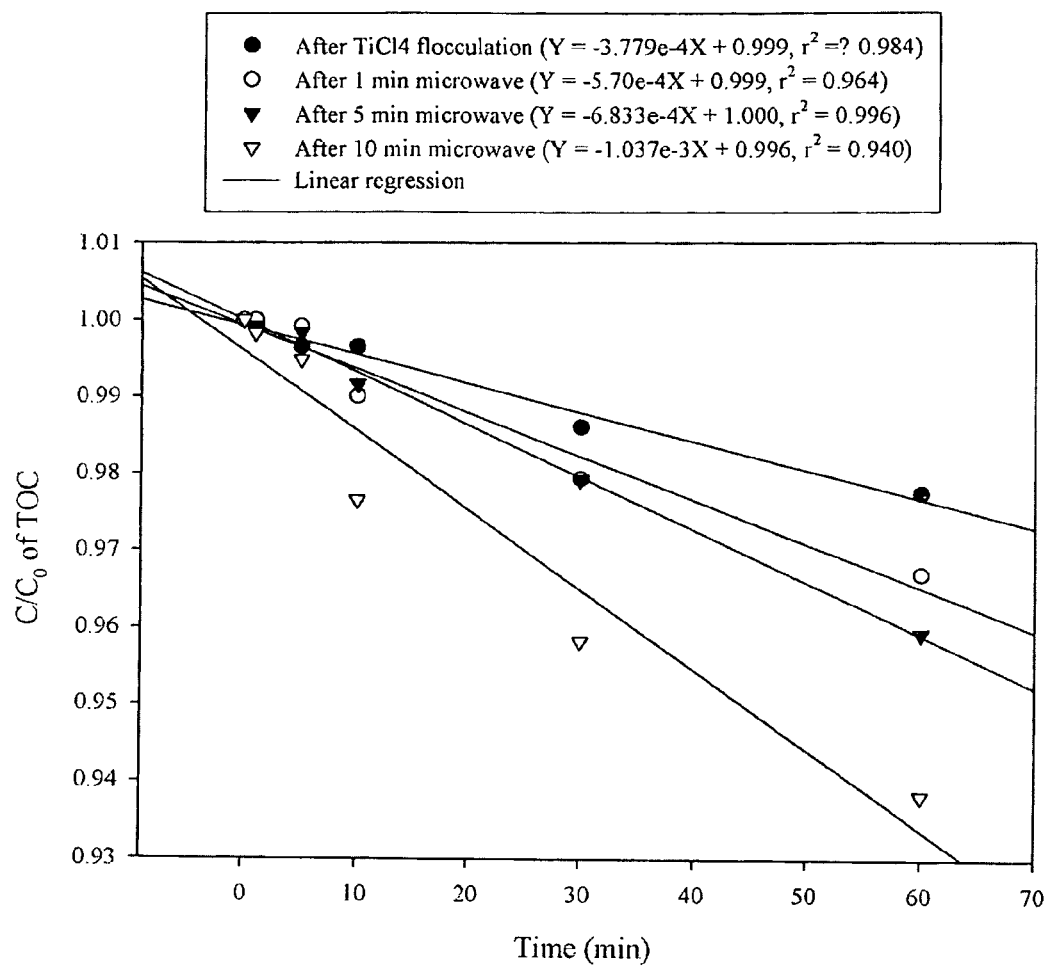
FIG. 16 is a graph depicting effect of microwave retention time with photoreactor after TiCl$_4$ flocculation (initial concentration of methylene blue (C$_0$)=10.0 mg/L; intensity=11 W (254.7 nm); UV output=8093 μW/cm$^2$).

Photocatalytic Reaction by the Remaining Titanium Compound in the Pre-Treated Water after Flocculation Followed by Microwave Treatment FIG. 16 presents the effect of microwave retention time with photoreactor after TiCl$_4$ flocculation from the contaminated water. Retention time of 0 min, 1 min, 5 min and 10 min microwave corresponds to temperature of 20° C., 38° C., 75° C. and 105° C. After microwave heating, all the samples were cooled down to room temperature. Methylene blue (C$_{16}$H$_{18}$ClN$_3$S.3H$_2$O) was used as representative organic matter and added at room temperature after microwave heating process to investigate photocatalytic activity. The pseudo first order equation was used to determine the rate constant (k) (Equation 2).

$$\ln(C_0/C) = kt \tag{2}$$

In the Equation 2, $C_0$=an initial concentration, C=the concentration of the reactant (mg/L), t=the illumination time (h), and k=the apparent photodegradation rate constant (h$^{-1}$).

The overall rate is presented in FIG. 16. The overall rate constant (k) with microwave treatment for 10 min was 2.7 times higher than that without microwave treatment. This may be due to the production of a photoactivity with the pre-treated water after TiCl$_4$ flocculation followed by microwave treatment.

According to the above examples, the use of titanium compounds as an alternative coagulant instead of iron and aluminum salts is proposed. Flocculation with TiCl$_4$ as a coagulant removes 70% of organic matter, which is equivalent to removal of organic matter by the most-widely used coagulants (FeCl$_3$ and alum). The removal trend of molecular weight distribution and protein-like substance of organic matter by TiCl$_4$ flocculation is also similar to that by FeCl$_3$ and alum flocculation.

The PFW titania is mainly doped with C, P and various trace elements (Si, Fe, Al, V, Ca, Na, Cr, Cl, S, Ni, and Br). The weight percentage of impurities in the PFW titania is 9.97% and 18 g/m$^3$ of PFW titania is produced in the experimental conditions. The PFW photocatalyst can be used with the sources of solar irradiation and interior lighting.

The anatase pattern is found over 600° C. calcinations temperatures. At 1000° C., the anatase structure changes to rutile. For alum flocculation, Al$_2$O$_3$ is made at 1000° C. cacination temperature. On the other hand, the floc after FeCl3 flocculation is found to be different crystals (hematite (Fe$_2$O$_3$) and grattarolaite (Fe$_3$(PO$_4$)O$_3$ or Fe$_3$PO$_7$).

Another method proposed is to cause a photocatalytic reaction using the remaining hydrolyzed metal compounds in the pre-treated water followed by microwave treatment. The overall rate constant (k) with microwave treatment for 10 min is three times higher than that without microwave treatment.

It should be noted that the embodiments of the present invention described herein have been given for the purpose of illustration and examples. Those skilled in the art will realize that changes and modifications may be investigated thereto. It is not intended to limit the invention of any of the precise embodiments disclosed.

REFERENCES

Tchobanoglous G. and Burton F. L. (1991) Wastewater engineering: treatment, disposal, and reuse. 3rd Eds., MacGraw-Hill, Inc. New York.

Vigneswaran S. and Visvanathan C. (1995) Water treatment processes: simple options. CRC press, Florida, USA.

DeWolfe J., Dempsey B., Taylor M. and Potter J. W. (2003) Guidance manual for coagulant changeover. AWWA Research foundation, Denver.

Gogate P. R. and Pandit A. B. (2003) A review of imperative technologies for wastewater treatment I: oxidation technologies at ambient conditions. Advances in Environmental Research 8 (3-4), 501-551.

Hoigne J. (1997) Inter-calibration of OH. radical sources and water quality parameters. Water Science and Technology, 35 (4), 1-8.

Molinari R., Borgese M., Drioli E., Palmisano L. and Schiavello M. (2002) Hybrid processes coupling photocatalysis and membranes for degradation of organic pollutants in water. Catalysis Today 75 (1-4), 77-85.

Chu W. and Wong C. C. (2004) The photocatalytic degradation of dicamba in TiO2 suspensions with the help of hydrogen peroxide by different near UV irradiations. Water Research 38 (4), 1037-1043.

Shon H. K. (2006) Ultrafiltration and nanofiltration hybrid systems in wastewater treatment and reuse. Ph.D. dissertation. University of Technology, Sydney. Seo G. T. (1997) Ohgaki S, Suzuki Y. Sorption characteristics of biological powdered activated carbon in BPAC-MF (biological activated carbon-microfiltration) system for refractory organic removal. Wat. Sci. Technol. 35(7), 163-170.

Her, N. G. Identification and characterization of foulants and sealants on NF membrane. Ph.D. dissertation, Department of Civil, Environmental, and Architectural engineering, University of Colorado at Boulder, 2002.

Tonejc A. M., I. Dierdj and A. Tonejc Evidence from HRTEM image processing, XRD and EDS on nanocrystalline iron-doped titanium oxide powders. Materials Science and Engineering B, Volume 85, Issue 1, 6 Aug. 2001, Pages 55-63.

Liao S. C., W. E. Mayo and K. D. Pae Theory of high pressure/low temperature sintering of bulk nanocrystalline TiO2. Acta Materialia, Volume 45, Issue 10, October 1997, Pages 4027-4040.

Asahi R., Morikawa T., Ohwaki T., Aoki K. and Taga Y. (2001) Visible-light photocatalysis in nitrogen-doped titanium oxides. Science, 293, 269-271.

The invention claimed is:

1. A method of producing an organic-inorganic element-doped metal oxide including anatase or rutile titania from a hydrolysable titanium compound, accompanied with a contaminated water treatment, comprising steps of:
   a) adding the hydrolysable titanium compound as a coagulant to a contaminated water to form a separable floc between the hydrolysable titanium compound and contaminants present in contaminated water;
   b) separating the separable floc and a pre-treated water after flocculation treatment; and
   c) subjecting the separated floc to a temperature of at least 500° C. to produce an anatase or rutile titania mainly doped with C and P atoms.

2. The method of claim 1, wherein the hydrolysable titanium compound is selected from the group consisting of titanium trichloride, titanium tetrachloride, titanyl sulfate, titanium sulfate, titanium oxysulfate and titanium iron sulfate.

3. The method of claim 1, wherein the pre-treated water of the step b) is further subjected to a microwave treatment to cause a photocatalytic degradation of an organic contaminant that remains in the pre-treated water, with the assistance of the remaining hydrolysable titanium compound.

4. The method of claim 3, wherein the microwave treatment applies to the pretreated effluent, either simultaneous with UV irradiation, or prior to UV irradiation.

5. The method of claim 1, wherein the temperature is in a range of between 500 and 1000° C.

6. The method of claim 1, wherein the produced titania is further doped with additional trace elements, Si, Fe, Al, V, Ca, Na, Cr, Cl, S, Ni, and Br.

7. The method of claim 1, wherein the contaminated water includes surface water, groundwater and wastewater.

* * * * *